United States Patent [19]

Roesky et al.

[11] Patent Number: 5,150,985
[45] Date of Patent: Sep. 29, 1992

[54] METHOD OF DISPOSING OF SALT-CONTAINING DUSTS FROM INCINERATOR PLANTS

[75] Inventors: Werner Roesky, Overath; Dieter Deffner, Bergisch Gladbach; Manfred Wolter, Leverkusen, all of Fed. Rep. of Germany

[73] Assignee: Sante Corporation, Largo, Fla.

[21] Appl. No.: 597,991

[22] Filed: Oct. 17, 1990

[30] Foreign Application Priority Data

Oct. 19, 1989 [DE] Fed. Rep. of Germany ....... 3934948

[51] Int. Cl.$^5$ .............................................. B09B 3/00
[52] U.S. Cl. .................................... 405/128; 106/710; 210/751
[58] Field of Search ............... 405/128, 129; 106/709, 106/710; 210/751

[56] References Cited

U.S. PATENT DOCUMENTS

| | | |
|---|---|---|
| 4,354,876 | 10/1982 | Webster .......................... 405/128 X |
| 4,375,986 | 3/1983 | Pichat ............................. 106/710 X |
| 4,496,267 | 1/1985 | Gnaedinger .................... 405/128 X |
| 4,629,509 | 12/1986 | O'Hara et al. .................. 106/710 X |
| 4,780,144 | 10/1988 | Loggers ............................... 106/710 |
| 4,844,815 | 7/1989 | Ader et al. ...................... 405/129 X |
| 4,925,614 | 5/1990 | Gebhard ........................ 264/333 X |
| 4,931,192 | 6/1990 | Covington et al. ............. 405/129 X |
| 4,952,242 | 8/1990 | Earp ............................... 405/128 X |

Primary Examiner—Dennis L. Taylor
Attorney, Agent, or Firm—Bradford E. Kile; Ruffin B. Cordell

[57] ABSTRACT

A method of disposing of salt-containing dusts from incinerator plants by mixing salt-containing dusts, having approximately 1% or less of lime with cement and water. The amount of cement in the mixture is between 3% and 25% of the total mixture. The amount of hydrothermally reactive powdered components is not less than 8% of the total mixture. The mixture is compacted into discrete compacts, and hardened in an autoclave by saturated steam with a pressure of at least 1 bar to form stable compacts.

16 Claims, No Drawings

METHOD OF DISPOSING OF SALT-CONTAINING DUSTS FROM INCINERATOR PLANTS

RELATED PATENT

This application is related to the subject matter of prior U.S. Pat. No. 4,941,772 entitled "Method of Disposing of Salt-Containing Dusts from Incinerator Plants" issued Jul. 17, 1990.

BACKGROUND OF THE INVENTION

This invention relates to a novel method for the disposal of dusts from incinerator plants.

A process is known for the disposal of salt-containing dusts from garbage incinerator plants by the German patent DE-OS 3734 879, wherein, with the addition of water, the salt-containing dusts are mixed intensively with other waste materials, such as ash and fly ash from thermal power plants fired with brown coal (lignite) or hard coal, silica containing sands, waste rubble, or waste materials from calcium carbide production. The mixture contains at least 8% hydrothermally reactive calcium oxide or equivalent amounts of other hydrothermally reactive compounds, and the water admixture is so rated that an optimum compaction is possible. The mixture is thereafter processed by compacting the mixture into rigid compacts. The compacts are subsequently hardened in an autoclave by saturated steam with a pressure of at least 1 bar.

This known process for the treatment of salt-containing dusts from flue gas cleaning plants, using the dry or semi-dry process, is unsuitable for the processing of dust from incinerator plants. The inadequacy is due to the small quantities of or absence of hydrothermally reactive calcium hydroxide in the salt-containing dusts.

The cleaning of the flue gas from incinerator plants is accomplished in at least two steps: in one stage, all solid detrimental materials are separated and, in a second stage, the gaseous materials are removed by the addition of water or water and chemicals. The removal of solid particles, which are also designated "dusts" or "fly ashes", is accomplished by bag filters or by electrostatic precipitators. Salt-containing dusts are obtained when the dry or semi-dry cleaning procedures are used for cleaning the flue gases from incinerator plants. These salt-containing dusts are a mixture of fly ashes and salts, in particular calcium sulfate, calcium chloride, and calcium fluoride or the hydrates of these salts.

It is common practice to inject quick lime or pulverized limestone into the combustion chamber in order to reduce the content of sulfate and chloride in the flue gas. Due to this practice, the content of the sulfate, chloride, and free quick lime are increased in the fly ashes. The content of free lime in these dusts originates from a surplus of injected lime which does not react with the sulfates and the chlorides contained in the flue gases.

A procedure for the treatment of dusts from incinerator plants is known wherein the dusts are mixed with cement and a quantity of water that produces a crumbling mass of low water content. The mixture is transported to a landfill and is compacted through the use of the usual ground compacting equipment. After compaction, the dust-cement mix cures in the usual way in situ. The disadvantage of this procedure is that the relatively large content of free hydrated lime in the mix results in a high pH value and therefore a high solubility of lead. Consequently, it is obligatory to dispose of the material in a specially classified landfill, and it is also impossible to use such materials as aggregates for concrete.

DETAILED DESCRIPTION

The invention relates to a process for the decontamination of dusts with high and low contents of lime from incinerator plants, as well as to the decontamination of salt-containing dusts originating from the dry and semi-dry cleaning of flue gases from incinerator plants. The invention provides a process for the decontamination and disposal of dusts containing heavy metals from incinerator plants. An industrial process generates quality-controlled products which, with respect to the eluation of heavy metals, meet the standards required for an ordinary landfill (class 2 according to German standards) and which can also be used in the construction industry.

Based on the decontamination process for salt-containing dusts described previously, the invention solves this task in the following way: dusts from incinerator plants with a low content of lime are mixed together with water and cement or with water and a mixture of cement and hydrated lime, and dusts from incinerator plants with hydrothermally reactive lime are mixed with water and cement or with water and a mixture of cement and waste materials, such as silica flour or fly ashes from thermal plants fired with hard coal, which can bind with lime during the hydrothermal process.

It has also been found advantageous to process salt-containing dusts from incinerator plants together with water and cement to increase the strength of the uncured compacts. Uncured compacts are compacts which have not yet been treated in an autoclave. A sufficiently high strength of uncured compacts is particularly important if the mixture of dusts and binding agents is compacted on roll presses. The compacts from these machines are not handled by an automated stacking machine, which normally places the brick-shaped compacts formed on a hydraulic press onto a brick wagon. Instead, the compacts fall onto a screening machine which separates fines from the compacts and which exerts considerable strain on the uncured compact.

The use of cement as a binding agent increases the percentage of dust compacted. Therefore, smaller volume quantities are shipped to the landfill or to the place where the material is used for construction.

The admixture of cement or of a mixture of cement and lime or of a mixture of cement and a lime binding material, as well as autoclaving pressure and autoclaving time, are chosen in such a way that the pH value of the eluate from the finished products, determined in accordance with DIN 38414, part 4, is about 11.

The solubility of heavy metals is a function of the pH value. It has been found that the solubility of cadmium decreases in the pH range from 9 to 13. The solubility of lead also decreases up to a pH value of approximately 11, but lead solubility increases above this value. Therefore, the optimum range for both heavy metals is approximately 11. In addition, chrome, nickel, and zinc have a minimum solubility in this range.

However, when applying the conventional procedures of molding a mixture of dust and salt-containing dusts, the reactions between cement and water do not only leave the lime unreacted but set free hydrated lime by the hydration of the cement. Therefore, the pH value of the eluates from such mixtures is above 12. As explained previously, this range of pH values is very unfavorable. It has been verified that, by a hydrothermal treatment, the excess quantity of hydrated lime reacts with the silicate and aluminate components of the fly ash, whereby the pH value is reduced and at the same time the strength of the products is increased.

The method according to the invention will be explained in detail with the aid of the following examples.

EXAMPLE 1

In a mixer, 85 parts by weight of a dust with a low content of lime from a garbage incinerator plant having a free lime content of approximately 1% CaO are mixed intensively with 15 parts by weight of cement with the addition of 7 parts by weight of water for 100 parts by weight of solids. This mix is compacted on a roller press into oval briquettes with a volume of 14 cm$^3$ each. A specific compacting pressure of 10 to 18 kN/cm is applied.

Afterwards the compacts are cured with saturated steam in an autoclave for a period of 4 hours at a pressure of 16 bars. The time required for raising the pressure is 1 hour, and the time of depressurizing is 2 hours.

The eluate values of the dust and the finished compacts were determined in accordance with DIN 38414, part 4.

In the following table:

Column 1 gives the admissible eluate values of the drinking water regulations of 1986 (German standards);

Column 2 gives the admissible eluate values of dump class 2 (German standards);

Column 3 gives the eluate values of the processed dusts; and

Column 4 gives the eluate values of the products made in accordance with Example 1.

TABLE

|  | I drinking water regulations | II dump class 2 | III dust with low CaO content | IV finished product |
|---|---|---|---|---|
| pH | 6.5-9.5 | 5.5-12.0 | 11.4 | 10.1 |
| Pb mg/l | 0.04 | 0.5 | 0.19 | <0.005 |
| Hg mg/l | 0.001 | 0.005 | 0.002 | 0.0016 |
| Cd mg/l | 0.005 | 0.05 | 0.002 | <0.0005 |
| TL mg/l | — | 0.1 | 0.05 | <0.005 |
| Zn mg/l | — | 5.0 | 0.38 | <0.01 |
| Sn mg/l | — | 0.5 | <0.005 | <0.005 |
| Ni mg/l | 0.05 | 0.5 | <0.005 | <0.005 |
| Cr, tot mg/l | 0.05 | 1.0 | <0.007 | 0.028 |
| Ba, mg/l | — | 1.0 | 0.52 | 0.11 |
| strength of spot N |  |  |  | 1,150 |

EXAMPLE 2

Instead of the dust with the low content of lime used in Example 1, dust from another incinerator plant with a content of free lime of approximately 18% CaO was used. The remaining test conditions were left unchanged.

The following results were found:

Column 1 gives the admissible eluate values of the drinking water regulations of 1986 (German standards);

Column 2 gives the admissible eluate values of dump class 2 (German standards);

Column 3 gives the eluate values of the processed dusts; and

Column 4 gives the eluate values of the products made in accordance with Example 2.

TABLE

|  | I drinking water regulations | II dump class 2 | III dust with low CaO content | IV finished product |
|---|---|---|---|---|
| pH | 6.5-9.5 | 5.5-12.0 | 12.4 | 12.3 |
| Pb mg/l | 0.04 | 0.5 | 74 | 1.6 |
| Hg mg/l | 0.001 | 0.005 | 0.0002 | 0.0008 |
| Cd mg/l | 0.005 | 0.05 | 0.0005 | <0.0005 |
| TL mg/l | — | 0.1 | 0.01 | 0.01 |
| Zn mg/l | — | 5.0 | 4.0 | 0.05 |
| Sn mg/l | — | 0.5 | 0.01 | 0.01 |
| Ni mg/l | 0.05 | 0.5 | 0.005 | 0.005 |
| Cr, tot mg/l | 0.05 | 1.0 | 0.09 | 0.03 |
| Ba, mg/l | — | 1.0 | 0.09 | 0.24 |
| strength of spot N |  |  |  | 980 |

Due to the high pH value of the finished product, which is caused by the high content of free lime in the dust from the incinerator plant, high eluate values were reported for the lead.

EXAMPLE 3

The same dust with high lime content from an incinerator plant, which was used in Example 2, was mixed with 10% cement and 5% silica flour (90% finer than 0.09 mm). All other test conditions were left unchanged The following results were obtained:

Column 1 gives the admissible eluate values of the drinking water regulations of 1986 (German standards);

Column 2 gives the admissible eluate values of dump class 2 (German standards);

Column 3 gives the eluate values of the processed dusts; and

Column 4 gives the eluate values of the products made in accordance with Example 2.

TABLE

|  | I drinking water regulations | II dump class 2 | III dust with low CaO content | IV finished product |
|---|---|---|---|---|
| pH | 6.5-9.5 | 5.5-12.0 | 12.4 | 10.7 |
| Pb mg/l | 0.04 | 0.5 | 74 | 0.02 |
| Hg mg/l | 0.001 | 0.005 | <0.0002 | 0.0008 |
| Cd mg/l | 0.005 | 0.05 | <0.0005 | <0.0005 |
| TL mg/l | — | 0.1 | <0.01 | <0.01 |
| Zn mg/l | — | 5.0 | 4.0 | <0.05 |
| Sn mg/l | — | 0.5 | 0.01 | <0.01 |
| Ni mg/l | 0.05 | 0.5 | <0.005 | <0.005 |
| Cr, tot mg/l | 0.05 | 1.0 | <0.09 | 0.07 |
| Ba, mg/l | — | 1.0 | 0.09 | 0.09 |
| strength of spot N |  |  |  | 1,020 |

This sample shows that, by the addition of a mixture of cement and silica flour, the excessive lime in the dust is bonded by the hydrothermal process. The pH value of the finished product is within the optimum range and, accordingly, a low solubility of all heavy metals is recorded.

EXAMPLE 4

The cement used in Example 1 was replaced by 15 parts by weight of hydrated lime. All other test conditions were left unchanged.

The spot strength was measured immediately after compaction ("green" compacts) and after autoclaving. The measurements were made by an Erichson testing machine with an advance of 8 mm/min. For each mixture containing either cement or hydrated lime, the average strength was determined from 16 samples.

The following figures were obtained:

| Mixture | spot strength "green" compacts N | spot strength finshed product N |
|---|---|---|
| 85% dust 15% cement | 500 | 1,150 |
| 85% dust 15% hydrated lime | 290 | 980 |

The spot strength of the "green" compacts made from cement is considerably higher than that of the compacts made with hydrated lime.

What is claimed is:

1. A method of disposing of salt-containing dusts from incinerator plants comprising the steps of:
   mixing salt-containing dusts, having approximately 1% or less lime, with cement and water, whereby the amount of cement is between 3% and 25% of the total mixture, and the amount of hydrothermally reactive powdered components is not less than 8% of the total mixture;
   compacting the mixture into discrete compacts,
   hardening the discrete compacts in an autoclave by saturated steam with a pressure of at least 1 bar to form stable compacts.

2. A method as defined in claim 1 wherein:
   said salt-containing dusts have a content of lime of approximately 1% calcium oxide.

3. A method as defined in claim 1 wherein:
   said step of mixing includes a step of adjusting the mixture composition so that a pH value of eluate of the compacted products is approximately 11.

4. A method as defined in claim 1 wherein:
   said salt-containing dusts are at least partly replaced by slurries containing heavy metals, in particular slurries from galvanic plants.

5. A method as defined in claim 3 wherein:
   said salt-containing dusts are at least partly replaced by slurries containing heavy metals, in particular slurries from galvanic plants.

6. A method of disposing of salt-containing dusts from incinerator plants comprising the steps of:
   mixing salt-containing dusts, having approximately 1% or less lime, with a mixture of cement and hydrated lime together with water, whereby the amount of said mixture of cement and hydrated lime is between 3% and 25% of the total mixture, and the amount of hydrothermally reactive powdered components is not less than 8% of the total mixture;
   compacting the mixture into discrete compacts;
   hardening the discrete compacts in an autoclave by saturated steam with a pressure of at least 1 bar to form stable compacts.

7. A method as defined in claim 6 wherein:
   said salt-containing dusts have a content of lime of approximately 1% calcium oxide.

8. A method as defined in claim 6 wherein:
   said step of mixing includes a step of adjusting the mixture composition so that a pH value of eluate of the compacted products is approximately 11.

9. A method as defined in claim 6 wherein:
   said salt-containing dusts are at least partly replaced by slurries containing heavy metals, in particular slurries from galvanic plants.

10. A method as defined in claim 8 wherein:
    said salt-containing dusts are at least partly replaced by slurries containing heavy metals, in particular slurries from galvanic plants.

11. A method of disposing of salt-containing dusts from incinerator plants comprising the steps of:
    mixing salt-containing dusts which contain hydrothermally reactive line with cement, water and a material which is operable to bind with lime during a hydrothermal process, whereby the amount of said mixture of cement and a material which is operable to bind with lime is between 3% and 25% of the total mixture, and the amount of hydrothermally reactive powdered components is not less than 8% of the total mixture;
    compacting the mixture into discrete compacts,
    hardening the discrete compacts in an autoclave by saturated steam with a pressure of at least 1 bar to form stable compacts.

12. A method as defined in claim 11 wherein:
    said step of mixing includes a step of adjusting the mixture composition so that a pH value of eluate of the compacted products is approximately 11.

13. A method as defined in claim 11 wherein:
    said salt-containing dusts are at least partly replaced by slurries containing heavy metals, in particular slurries from galvanic plants.

14. A method as defined in claim 12 wherein:
    said salt-containing dusts are at least partly replaced by slurries containing heavy metals, in particular slurries from galvanic plants.

15. A method of disposing of salt-containing dusts from incinerator plants comprising the steps of:
    mixing salt-containing dusts having approximately 1% or less lime, with cement and water, whereby the amount of cement is between 3% and 25% of the total mixture, and the amount of hydrothermally reactive powdered components is not less than 8% of the total mixture;
    compacting the mixture into discrete compacts,
    hardening the discrete compacts in an autoclave by saturated steam with a pressure of at least 1 bar to form stable compacts.

16. A method of disposing of salt-containing dusts from incinerator plants comprising the steps of:
    mixing salt-containing dusts, having approximately 1% or less lime, with a mixture of cement and hydrated lime together with water, whereby the amount of said mixture of cement and hydrated lime is between 3% and 25% of the total mixture, and the amount of hydrothermally reactive powdered components is not less than 8% of the total mixture;
    compacting the mixture into discrete compacts, hardening the discrete compacts in an autoclave by saturated steam with a pressure of at least 1 bar to form stable compacts.

* * * * *